(12) United States Patent
Giesler et al.

(10) Patent No.: US 9,221,384 B2
(45) Date of Patent: Dec. 29, 2015

(54) METHOD FOR CONTROLLING A DISPLAY DEVICE OF A MOTOR VEHICLE

(71) Applicant: Audi AG, Ingolstadt (DE)

(72) Inventors: Björn Giesler, Ingolstadt (DE); Patrick Heinemann, Kösching (DE); Michael Schadeck, Ingolstadt (DE); Stefan Stümper, Eichstätt (DE)

(73) Assignee: AUDI AG, Ingolstadt (DE)

( * ) Notice: Subject to any disclaimer, the term of this patent is extended or adjusted under 35 U.S.C. 154(b) by 229 days.

(21) Appl. No.: 13/719,938

(22) Filed: Dec. 19, 2012

(65) Prior Publication Data

US 2013/0154816 A1 Jun. 20, 2013

(30) Foreign Application Priority Data

Dec. 20, 2011 (DE) .......................... 10 2011 121 616

(51) Int. Cl.
*B60Q 1/00* (2006.01)
*B60Q 9/00* (2006.01)

(52) U.S. Cl.
CPC *B60Q 1/00* (2013.01); *B60Q 9/005* (2013.01); *B60Q 9/008* (2013.01)

(58) Field of Classification Search
CPC ..... B60K 35/00; B60Q 1/525; G01R 19/0038
USPC ........................... 340/980, 435–438, 519, 525
See application file for complete search history.

(56) References Cited

U.S. PATENT DOCUMENTS

| | | | | |
|---|---|---|---|---|
| 5,777,563 | A * | 7/1998 | Minissale et al. | 340/903 |
| 6,348,877 | B1 * | 2/2002 | Berstis et al. | 340/980 |
| 6,476,855 | B1 * | 11/2002 | Yamamoto | 348/148 |
| 6,636,258 | B2 * | 10/2003 | Strumolo | 348/149 |
| 7,061,401 | B2 * | 6/2006 | Voos et al. | 340/961 |
| 7,245,275 | B2 * | 7/2007 | Okada et al. | 345/32 |
| 7,400,233 | B2 * | 7/2008 | Kondo | 340/435 |
| 7,466,338 | B2 * | 12/2008 | Xie | 348/148 |
| 7,605,773 | B2 * | 10/2009 | Janssen | 345/7 |
| 7,741,962 | B2 * | 6/2010 | Kalik | 340/438 |
| 7,847,678 | B2 * | 12/2010 | Kawamata et al. | 340/435 |
| 7,952,808 | B2 * | 5/2011 | Hotta et al. | 359/630 |
| 7,986,371 | B2 * | 7/2011 | Suzuki et al. | 348/523 |

(Continued)

FOREIGN PATENT DOCUMENTS

DE 101 31 720 A1 1/2003
DE 10 2004 016 808 A1 10/2005

(Continued)

*Primary Examiner* — Fekadeselassie Girma
*Assistant Examiner* — Son M Tang
(74) *Attorney, Agent, or Firm* — Henry M. Feiereisen LLC

(57) ABSTRACT

In a method for controlling a display device of a motor vehicle for displaying an environmental information relating to an environment of the motor vehicle, the environmental information is assigned at least one directional information which describes a detection direction of a detection device used for determining the environmental information or a direction to an object described by the environmental information based on a reference point, in particular a sitting position of the driver inside the motor vehicle, wherein the display device for displaying the environmental information which covers at least one angular range which lies in a horizontal plane is activated in a sub-range of the angular range which is assigned to the directional information.

19 Claims, 4 Drawing Sheets

(56) References Cited

U.S. PATENT DOCUMENTS

| | | | |
|---|---|---|---|
| 8,049,609 B2* | 11/2011 | Takahashi et al. | 340/461 |
| 8,120,479 B2* | 2/2012 | Arie et al. | 340/461 |
| 8,350,724 B2* | 1/2013 | Szczerba et al. | 340/932.2 |
| 8,570,188 B2* | 10/2013 | Yamashita | 340/904 |
| 8,704,653 B2* | 4/2014 | Seder et al. | 340/461 |
| 8,754,760 B2* | 6/2014 | Augst | 340/435 |
| 2003/0035050 A1* | 2/2003 | Mizusawa et al. | 348/148 |
| 2005/0012685 A1* | 1/2005 | Okada et al. | 345/32 |
| 2005/0065721 A1* | 3/2005 | Herrtwich et al. | 701/207 |
| 2005/0134479 A1* | 6/2005 | Isaji et al. | 340/901 |
| 2006/0073684 A1 | 4/2006 | Schulze et al. | |
| 2006/0164219 A1* | 7/2006 | Knoll | 340/435 |
| 2007/0165108 A1* | 7/2007 | Yuasa et al. | 348/148 |
| 2007/0210906 A1* | 9/2007 | Knoll et al. | 340/461 |
| 2009/0009314 A1 | 1/2009 | Taniguchi et al. | |
| 2010/0201508 A1* | 8/2010 | Green et al. | 340/435 |
| 2011/0090073 A1 | 4/2011 | Ozaki | |
| 2011/0175752 A1* | 7/2011 | Augst | 340/905 |
| 2012/0062372 A1* | 3/2012 | Augst | 340/435 |
| 2012/0154589 A1* | 6/2012 | Watanabe | 348/148 |
| 2013/0083197 A1* | 4/2013 | Yamakage et al. | 348/148 |

FOREIGN PATENT DOCUMENTS

| | | |
|---|---|---|
| DE | 10 2005 042 913 A1 | 3/2007 |
| DE | 10 2007 057 725 A1 | 6/2008 |
| DE | 102008028303 A1 | 1/2009 |
| DE | 2008 064 022 A1 | 9/2009 |
| DE | 10 2008 019 461 A1 | 10/2009 |
| DE | 102008059269 A1 | 6/2010 |
| DE | 102009052868 A1 | 6/2010 |
| JP | 2006044596 A | 2/2006 |

* cited by examiner

METHOD FOR CONTROLLING A DISPLAY DEVICE OF A MOTOR VEHICLE

CROSS-REFERENCES TO RELATED APPLICATIONS

This application claims the priority of German Patent Application, Serial No. 10 2011 121 616.6, filed Dec. 20, 2011, pursuant to 35 U.S.C. 119(a)-(d), the disclosure of which is incorporated herein by reference.

BACKGROUND OF THE INVENTION

The present invention relates to a method for controlling a display device of a motor vehicle.

The following discussion of related art is provided to assist the reader in understanding the advantages of the invention, and is not to be construed as an admission that this related art is prior art to this invention.

Modern motor vehicles have a plurality of differently configured driver assist systems. These can for example be configured as parking assistants, pedestrian safety systems, blind spot assistants, or emergency brake assistants. Typically, at least one detection device is provided in these cases, which detects environmental information from the environment of the motor vehicle. The detection devices which represent an environmental sensor system of the motor vehicle are for example configured as ultrasound sensors, radar sensors, LIDAR sensors or optical sensors. The at least one detection device is operatively connected with a control device by means of which the detected environmental information can be analyzed. For this, in particular corresponding software can be provided which enables image recognition, so that objects present in particular in the vicinity of the motor vehicle are recognizable and identifiable. This enables assessment of a driving situation of the motor vehicle, which in particular includes early recognition of a collision risk.

In the parking assistant, an area behind the motor vehicle is in particular optically detected. By means of the detected environmental information, actuating interventions are automatically adjusted by means of the control device, in particular to change a yaw angle of the motor vehicle. For informing a driver in the motor vehicle, the environmental information which describes the area behind the motor vehicle is displayed on a central display device which in particular can be integrated in an instrument panel of the motor vehicle.

In pedestrian safety systems, a vicinity of the motor vehicle is monitored by means of the at least one detection device and the data detected in the course of this monitoring are analyzed with regard to whether a possible collision with the pedestrian is impending. The control device of the driver assist system analyses the environmental information and, in case a pedestrian was detected in the vicinity of the motor vehicle, outputs an abstract warning signal and/or an acoustic warning on the central display device.

In the blind spot assistant, areas in the vicinity of the motor vehicle are detected, which cannot be seen by the driver of the motor vehicle. In particular, these are angular ranges which, regarding a sitting position of the driver, are covered by a column of the motor vehicle. For avoiding accidents and collisions, the items of environmental information which correspond to the covered angle ranges are displayed on the display device.

It would be desirable and advantageous to provide an improved method for controlling a display device, so that the displayed environmental information can be perceived particularly intuitively.

SUMMARY OF THE INVENTION

According to one aspect of the present invention, a method for controlling a display device of a motor vehicle for displaying an item of environmental information relating to an environment of the motor vehicle, includes detecting the item of environmental information with a detection device which has a detection range which defines a direction of detection of the item of environmental information, assigning to the item of environmental information at least one item of directional information which describes the direction of detection or a direction to an object described by the environmental information, which direction to the object is defined in relation to a reference point inside the motor vehicle; and activating the display device for displaying the environmental information, wherein the display device extends over at least one angular range defining a horizontal plane, wherein the display device is activated in a sub-range of the angular range, and wherein the sub-range is assigned to the directional information.

The display device is arranged inside the vehicle so as to at least partially circumferentially enclose a passenger compartment border-side. The environmental information is displayed on a display device at a site which corresponds to the sub-range, so that the directional information which is assigned to the sub-range can be particularly easily and intuitively be accessed by the driver. This is made possible by the extent of the display device over the angular range which lies in the horizontal plane. If for example, a danger of an impending collision is recognized, which approaches the motor vehicle from the direction with regard to the sitting position of the driver, the display device is activated in the sub-range which is assigned to the directional information. For determining the directional information, in particular the detection direction of the detection device which is configured as optical sensor or camera can be used. As an alternative to this, the direction is determined based on the environmental information which describes the environment of the motor vehicle, for example by means of image recognition. If for example the object which is described by the environmental information is on a collision course with the motor vehicle, which collision course defines the directional information, the display device is controlled in such a manner that the environmental information is displayed in the sub-range of the display device, which sub-range is assigned to the directional information.

The method according to the invention is particularly suited to be implemented in a driver assist system of the motor vehicle. This can in particular include parking assistants, pedestrian safety systems and/or blind spot assistants.

Particularly preferably, the sub-range is selected so that the environmental information is outputted at an angle which corresponds to the direction of the object described by the environmental information. With this, the driver is particularly intuitively informed with regard to from which direction to expect a potential danger. Thus, in case a possible risk of collision, for example a corresponding warning signal is issued for protecting pedestrians. If a motor vehicle approaches the pedestrian for example from the left with regard to the seating position of the driver, the display device is activated in a corresponding range on the left. The environmental information is thus displayed so that it is perceivable by the driver at an angle which is perceivable in the direction from which the pedestrian approaches the motor vehicle. The directional information which is assigned to the sub-range can thus be easily intuitively perceived by the driver, thereby enabling the driver to adequately react to the dangerous situation.

In a preferred exemplary embodiment of the invention, an imaging device serves as detection device with a detection range which defines the detection direction. The imaging device is in particular configured as optical sensor. As environmental information, the detected image which may be post-processed is outputted in the sub-range of the angular range. In particular, the post processed and detected image can be outputted on a side of the driver or in the rear vehicle interior. Thus the driver is provided with a type of all around visibility which extends the previous visibility through the vehicle windows in a particularly advantageous manner. For outputting the environmental information, in particular the entire display device can be used, wherein different sub-ranges are assigned to different imaging devices. The sub-range of the display device which is used for the display of the environmental information corresponds to the detection range of the detection device. As an alternative to this, in another exemplary embodiment of the invention the environmental information which is outputted as image is correspondingly scaled so that the entire detection range is displayed in the assigned sub-range of the display device.

Advantageously, the display device is controlled so as to display the environmental information in a temporally variable manner. In particular, it is provided to display the environmental information so as to blink, for example in the form of flashing warning signals which easily attract the attention of the driver. The display device is for example arranged in the region of an inner panel, which adjoins a border side of the at least one vehicle window, in particular the windshield. The displayed environmental information is thus located in the peripheral field of vision of the driver, in which a good perceptibility of the displayed environmental information is achieved by displaying the latter in a temporally variable manner or for example as animated or moving symbols. In particular in the case of a threat of a collision with a pedestrian, a blinking and abstracted pedestrian symbol is displayed in the sub-range which is assigned to the directional information.

According to an advantageous exemplary embodiment of the invention, in the environmental information which relates to the object additionally a distance of the object to an outer limit of the motor vehicle and/or to a fixed reference point of the motor vehicle which in particular is defined by a center of gravity of the motor vehicle is determined. In particular within the context of a parking assistant, it is useful to adjust the display of the environmental information in dependence on the distance in order to inform the driver of the criticality of the driving situation. If during parking the object is thus located in the vicinity of the motor vehicle, the display device is activated in the sub-range which corresponds to the direction of the object with regard to the sitting position of the driver. The output of the distance to the object is in this case color coded. If for example the object is sufficiently far away from the motor vehicle, the environmental information which corresponds to the object is outputted in the sub-range for example as green symbol. If on the other hand the distance to the object falls below a predetermined threshold value, the output occurs for example in red in order to indicate an immediately impending risk of collision.

In particular in the case of a driver assist system which is configured as parking assistant it the display device is arranged so as to extend at least partially over the width of the rear passenger compartment, for example border-side at a rear window. This enables outputting environmental information which is relevant for parking in the rear vehicle interior so that the driver can see the area behind the motor vehicle during parking. The rearward arranged display device hereby extends the range of perception of the driver in a particularly advantageous manner.

In advantageous exemplary embodiments of the invention, an acoustic signal is outputted in addition to the display of the environmental information, in particular when an additional condition is satisfied. The additional condition can for example be that the distance of the object falls below the predetermined or predeterminable threshold value. In particular, the output of the acoustic signal is provided in the implementation of the method within the framework of a parking assistant, a pedestrian safety system and/or a distance warning. The acoustic signal is outputted when reaching or falling below the threshold value for the distance, so that the driver is caused to immediately react to the danger situation.

In advantageous embodiments of the invention, the sub-range of the display device is activated so that the output occurs as a function of the sitting position of the driver in accordance with the direction to the object which is described by the environmental information. The sitting position of the driver defines the reference point of the output on the display device. In particular, the display device has to be activated in a slightly different sub-range when the sitting position of the driver changes. In this way, it can be ensured that the output of the environmental information occurs in accordance with the correct direction in which the object is located with regard to the sitting position. The sitting position is for example detected with a sensor system which detects the seat setting, in particular with regard to a longitudinal or transverse axis of the vehicle. In addition, a tilt angle of a backrest is detected so that the sitting position of the driver can be determined as accurately as possible. Further, the sitting position of the driver can be detected by means of a camera arranged inside the vehicle which continuously detects the sitting position of the driver during the drive.

The motor vehicle according the invention is configured for controlling the display device for implementing the method according to the invention. The previous discussion applies correspondingly to the motor vehicle. The motor vehicle includes the at least one display device and the control device which controls the display device. The environmental information can be provided to the control device, which has corresponding means for assigning the directional information to the environmental information, which means can for example be implemented as software or can be configured as integrated circuits.

Advantageously, the display device extends over the angular range which lies in the horizontal plane inside the vehicle along the passenger compartment. According to advantageous embodiments of the invention, the angular range of the display device is at least 90°, 180° or 270°. The display device is configured as optical output device in particular a monitor, or as display with LC technology (LC—is liquid crystal), which is configured to have a high optical resolution so as to enable the angularly resolved display of the directional information which is linked to the environmental information.

In a preferred exemplary embodiment of the invention, the display device is formed by a plurality of adjacently arranged display elements. The display elements are in particular arranged adjacent the border of the vehicle window and/or in the region of a vehicle door, a vehicle column, in particular an A-, B-, or C-column. The arrangement of at least one display element in the region of the vehicle column enables in particular that environmental information which would otherwise be covered by the vehicle column, can be displayed in the sub-range assigned thereto. With this, the image which is detected by the imaging device can in particular be displayed in the area of the vehicle column, wherein the image corresponds to the detection area, which corresponds to the blind spot. The region of the blind spot which, due to the vehicle column, is not visible, is thus displayed in the region of the vehicle column, the motor vehicle is thus in a manner of speaking made transparent for the driver so that in particular intersections can be easily visible.

According to a preferred exemplary embodiment of the invention, the display device additionally has means for outputting the acoustic signal. The output of the acoustic signal enables warning the driver, in particular in especially critical driving situations.

Preferably, the detection device is configured as optical sensor, as radar sensor, as LIDAR sensor and/or as ultrasound sensor. Radar sensors are in particular provided in the implementation of the method for controlling the display device in an adaptive distance warning system. In exemplary embodiments, which are configured as parking assistants, the use of ultrasound sensors is particularly advantageous because these have a suitable resolution in particular in the near range, in order to reliably recognize objects in the immediate vicinity of the motor vehicle. Optical sensors are particularly useful in driver assist systems which are configured for passenger safety or as blind spot assistants. Here, correspondingly detected images from blind spots can be displayed which are covered by a vehicle component.

The further detection unit detects the position of the driver seat inside the vehicle. This can for example occur in that seat settings of the driver seat are electronically read out and provided to the control device. Further, the position of the driver seat is detectable by means of a corresponding sensor system which detects the displacement of the driver seat, in particular relative to a longitudinal or transverse and/or vertical axis of the vehicle.

In a particularly preferred exemplary embodiment, the sitting position of the driver is continuously detected during the drive by means of a camera. This allows detecting even slight changes of the sitting position, such as for example a slight change of the position of the upper body of the driver so that the reference point with regard to which the environmental information is outputted in the sub-range of the display device can be accurately determined.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
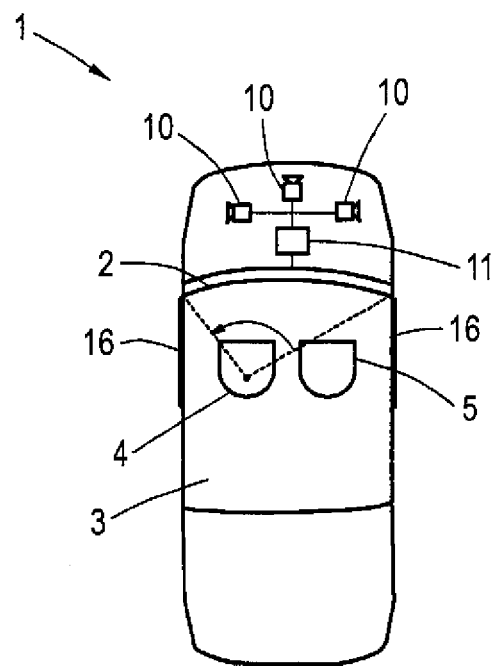
FIG. 1 shows a motor vehicle according to the invention which is configured for carrying out the method and has a display device which extends over an angular range of at least 90° which lies in a horizontal plane.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1, which has a display device 2 which is arranged so as to at least partially circumferentially surround an interior space of a vehicle or a passenger compartment 3 border-side. The display device 2 extends over an angular range which lies in a horizontal plane which is perpendicular to a vertical plane of the vehicle and extends over slightly more than 90°. The extent of the angular range is defined in relation to a reference point which is defined by a sitting position of a driver sitting on a driver seat 4. The display device 2 is configured as LC-display and arranged at a border of a windshield of the motor vehicle 1. The display device 2 extends over an entire vehicle width so that items of environmental information which are displayed on the display device 2 can also be perceived by a passenger sitting on a passenger seat 5.

Figure 2:
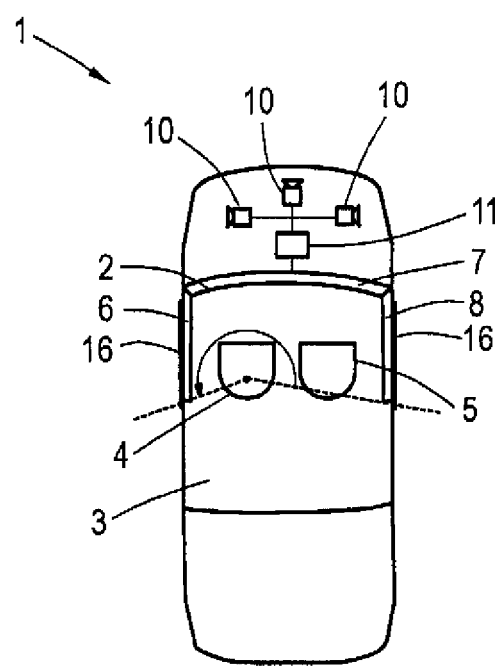
FIG. 2 shows a further exemplary embodiment of the motor vehicle with a display device, which extends over an angular range of at least 180°.

FIG. 2 shows a second exemplary embodiment of the motor vehicle 1, which has a display device 2, which extends over an angular range which lies in a horizontal plane and which extends slightly over 180° relative to the sitting position of the driver. The display device 2 is formed by three display elements 6, 7, 8, wherein the display elements 6, 8 at least partially extend over a width of a vehicle door 16.

Figure 3:
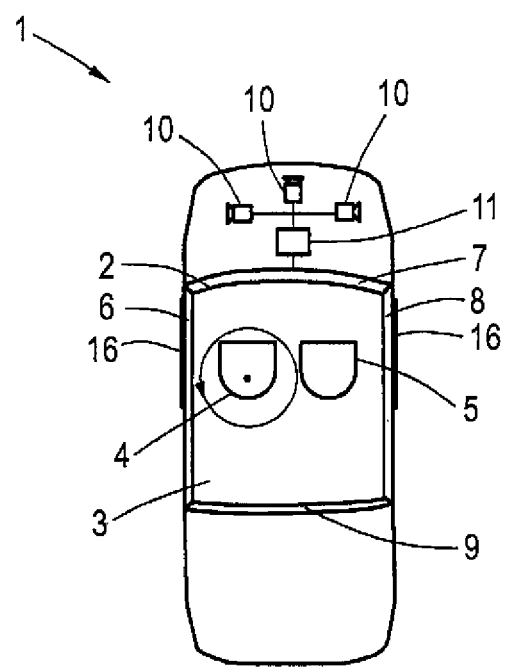
FIG. 3 shows a further exemplary embodiment of the motor vehicle with a display device whose angular range extends over 360°.

FIG. 3 shows a third exemplary embodiment of the motor vehicle 1, wherein a display device 2 is provided which surrounds the entire passenger compartment border-side. Regions of the display device 2 are formed by display elements 6, 7, 8, 9.

The exemplary embodiments shown in the FIGS. 1 to 3 have corresponding detection devices 10, by means of which the items of environmental information which relate to the environment of the motor vehicle 1 are detectable. The detection devices 10 are operatively connected to a control device 11 which is configured for controlling the display device 2. The control device 11 is configured so that the display device is controllable so as to display the environmental information in a sub-range 15 of the angular range which is assigned to the directional information, in dependence on an item of directional information which can be assigned to the environmental information.

Further, a further detection device is provided in a non shown manner, by means of which the sitting position of the driver is detectable. The further detection device is configured as camera. The sitting position of the driver defines the reference point with regard to which a direction 14 of an object 13 in the vicinity of the motor vehicle 1 is determined. The direction 14 corresponds to the activated sub-range of the display device 2. Thus, by means of the optical detection of the sitting position of the driver, the reference point and with this the corrected display of the environmental information in the sub-range 15 of the display device 2 is adjustable to the actual sitting position of the driver.

Figure 4:
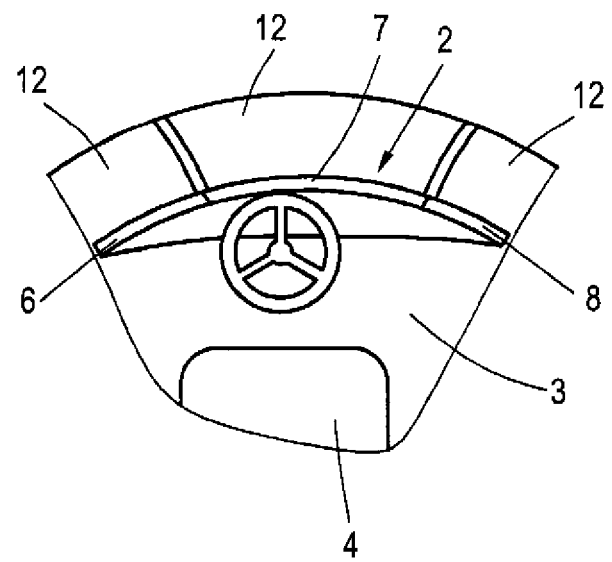
FIG. 4 shows a perspective view of a front region of a vehicle interior.

FIG. 4 shows in a perspective view a front side region of the passenger compartment 3. The display device 2 which is formed by the display elements 6, 7, 8, partially surrounds the passenger compartment 3. The display elements 6, 7, 8 are arranged border-side at the vehicle windows so that the environmental information which is displayed on the display device 2 is located in the peripheral field of vision of the driver during normal operation.

Figure 5:
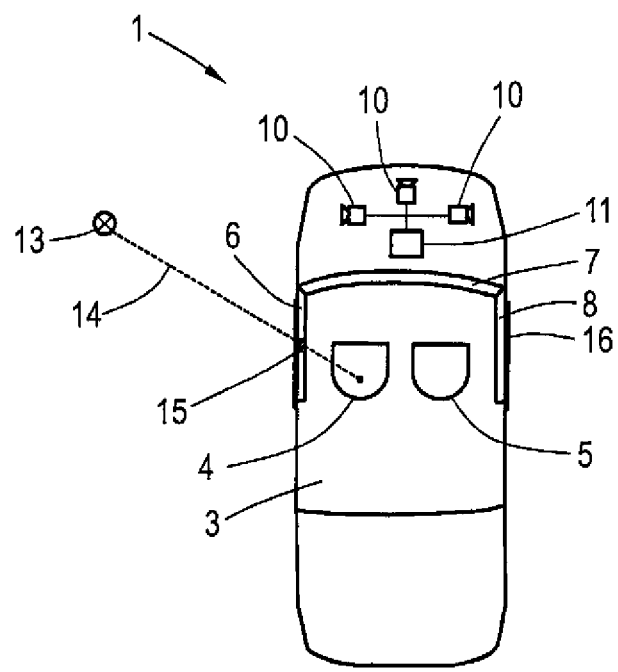
FIG. 5 shows a schematic representation of an item of environmental information according to an exemplary embodiment of a method for controlling the display device.

FIG. 5 shows the display of the environmental information on the display device 2 according to the method for controlling the display device 2. An object 13 is detected by means of one of the detection devices 10. The direction 14, which defines the position of the object 13 relative to the reference point which is defined by the sitting position of the driver, corresponds to the sub-range 15 which is activated for displaying the environmental information on the display device 2. Thus, the environmental information is displayed on the display device 2 so that the driver perceives the displayed environmental information at an angle which corresponds to the actual direction 14 of the object 13.

The object 13 in the example shown in FIG. 5 is a pedestrian who is present in the vicinity of the motor vehicle 1. The display is situation specific as temporally variable, blinking display of the environmental information in form of an abstracted symbol of a pedestrian, so that the outputted environmental information can be perceived by the driver more clearly. The activation of the sub-range 15 corresponding to the correct direction 14 enables an intuitive warning of the driver, irrespective of whether the object 13 is located in a region which is covered by a vehicle component such as an A-column. The activated sub-range 15 corresponds to the direction 14 from which a danger approaches the motor vehicle 1.

In addition, a distance of the object 13 to the motor vehicle 1 is detected by means of one of the detection devices 10. When the distance exceeds a predetermined or predeterminable threshold value, the environmental information is displayed in the sub-range 15 in green so that the driver is informed of the fact that no immediate risk of collision is given. However, when the distance of the object 13 to the motor vehicle falls below the predetermined or predeterminable threshold value, the environmental information is displayed in the sub-range 15 in red, to warn the driver of the impending collision risk. In addition, when falling below the threshold value, an acoustic signal is outputted for warning the driver. For this, the display device 2 is equipped in a not further shown manner with a corresponding means for outputting the acoustic signal.

In case of distances which do not fall below the threshold value however, are only slightly greater than the threshold value so that a collision risk cannot be excluded, the environmental information is displayed in the sub-range for example in orange.

The method represents an angularly resolved display of the environmental information, which in a particularly intuitive manner enables display of the directional information which is assigned to the environmental information. The color coding of the displayed environmental information enables particularly advantageously to indicate the distance to the object 13 in an intuitive and easy to perceive manner. Thus, the method for controlling the display device 2 of the motor vehicle 1 is particularly suited to be implemented in a driver assist system which is configured as pedestrian safety system, as parking assistant or as distance warning system.

In an alternative exemplary embodiment, the method for controlling the display device 2 is implemented within the framework of a lane change assistant. The object 13 which describes a vehicle located on a neighboring lane is displayed in the sub-range 15 so that the activated sub-range 15 is perceived by the driver at an angle which corresponds to the direction 14. When the object 13 moves relative to the motor vehicle 1 and/or relative to the sitting position of the driver, the display is correspondingly adjusted and, as the case may be, another sub-range 15 of the display device is activated. Particularly advantageously, this enables to direct the vision of the driver, thereby minimizing the risk of an accident resulting from inattentiveness of the driver.

Figure 6:
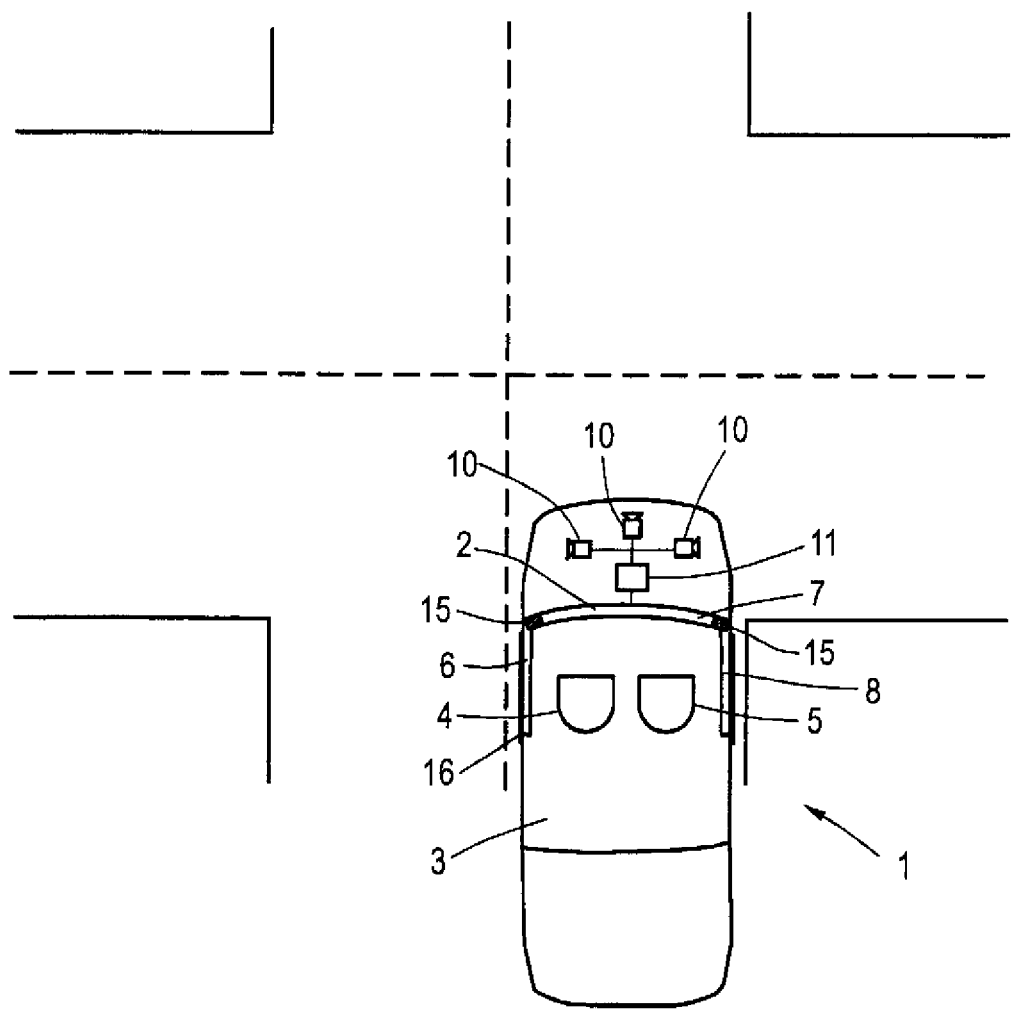
FIG. 6 shows a schematic representation of the environmental information according to a further exemplary embodiment of the method for controlling the display device.

FIG. 6 shows a further exemplary embodiment of the invention, in which the motor vehicle 1 approaches an intersection. The detection devices 10 which are configured as optical imaging devices view from the motor vehicle 1 into the left and the right course of the road before these areas become visible for the driver himself. The images generated during this are displayed in sub-ranges 15 which are correspondingly arranged on the left or on the right in a front side corner of the passenger compartment 3. The display of the environmental information in the sub-ranges 15 thus enables the angularly resolved and direction-resolved perception of environmental information which would otherwise be covered by the A-column of the motor vehicle 1. The display of the environmental information in the sub-ranges 15 corresponds to respective detection areas of the optical detection devices 13.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents to the elements recited therein:

1. A method for controlling a display device of a motor vehicle for displaying an item of environmental information relating to an environment of the motor vehicle, comprising the steps of:
   detecting the item of environmental information with a detection device, said detection device having a detection range which defines a direction of detection of the item of environmental information and being constructed as an imaging device, said environmental information being an image detected by the imaging device;
   assigning to the item of environmental information at least one item of directional information which describes one of the direction of detection, and a direction to an object described by the environmental information, said direction to the object being defined in relation to a reference point inside the motor vehicle; and
   activating the display device for displaying the environmental information, wherein the display device extends over at least one angular range defining a horizontal plane, wherein the display device is activated in a sub-range of the angular range, wherein the sub-range is assigned to the directional information, and wherein the display device extends along an entire inner circumference of the passenger compartment of the motor vehicle.

2. The method of claim 1, wherein the reference point is a sitting position of the driver.

3. The method of claim 2, wherein the sitting position is detected vehicle-side and a change of the sitting position causes a corresponding change of the directional information.

4. The method of claim 1, further comprising post-processing the image.

5. The method of claim 1, wherein the sub-range corresponds to the direction to the object.

6. The method of claim 1, wherein the display device is activated for display of the environmental information in a temporally variable manner.

7. The method of claim 6, wherein the display device is activated for a blinking display of the environmental information.

8. The method of claim 1, further comprising determining a distance of the object to an outer limit of the motor vehicle and/or to a fixed reference point of the motor vehicle, and adjusting wherein the display of the environmental information as a function of the distance.

9. The method of claim 8, further comprising outputting an acoustic signal.

10. The method of claim 9, wherein the acoustic signal is outputted in response to a condition being satisfied.

11. The method of claim 10, wherein the condition is a reaching of or falling below a predetermined or predeterminable threshold value for the distance of the object to the outer limit of the motor vehicle and/or to the reference point.

12. A motor vehicle, comprising:
at least one display device extending over at least one angular range lying in a horizontal plane;
a detection device constructed to detect an item of environmental information relating to an environment of the motor vehicle and having a detection range which defines a direction of detection of the item of environmental information, said detection device being constructed as an imaging device, said environmental information being an image detected by the imaging device, and
a control device for activating the display device in a sub-range of the angular range, so as to display the item of environmental information, said control device assigning a directional information to the environmental information said directional information describing one of a detection direction of the detection device and a direction to an object described by the environmental information, said direction to the object being defined in relation to a reference point inside the motor vehicle, wherein the at least one display device extends along an entire inner circumference of the passenger compartment of the motor vehicle.

13. The motor vehicle of claim 12 wherein the angular range, over which the display device extends, is one of at least 90°, at least 180°, and at least 270°.

14. The motor vehicle of claim 12, wherein the display device is formed by a plurality of adjacently arranged display elements.

15. The motor vehicle of claim 12, wherein the display device further comprises means for outputting an acoustic signal.

16. The motor vehicle of claim 12, wherein the detection device is constructed as at least one of an optical sensor, a radar sensor and an ultrasound sensor.

17. The motor vehicle of claim 12, further comprising a further detection device for detecting a sitting position of a driver inside the vehicle.

18. The motor vehicle of claim 17, wherein the further detection device is constructed as optical detection device.

19. The motor vehicle of claim 17, wherein the further detection device is constructed as a camera.

* * * * *